United States Patent

[11] 3,578,958

[72] Inventor David A. Richardson
Sheldonville, Mass.
[21] Appl. No. 845,642
[22] Filed July 8, 1969
[45] Patented May 18, 1971
[73] Assignee The Foxboro Company
Foxboro, Mass.
Continuation of application Ser. No.
582,750, Sept. 28, 1966, now abandoned.

[54] DIGITAL AND ANALOG PROCESS CONTROL APPARATUS
21 Claims, 1 Drawing Fig.
[52] U.S. Cl.................................................. 235/150.5,
235/151.34, 235/153
[51] Int. Cl....................................................... G06j 3/00,
G06p 11/00
[50] Field of Search............................................ 235/150.5,
.51, .52, .53, .3, .31, .4, .34, 153

[56] References Cited
UNITED STATES PATENTS
3,081,942 3/1963 Mallay........................... 235/150.5X
3,221,155 11/1965 Birkel, Jr....................... 235/150.5X
3,320,409 5/1967 Carrowe........................ 235/150.5X Primary Examiner—Malcolm A. Morrison
Assistant Examiner—Joseph F. Ruggiero
Attorney—Robertson, Bryan, Parmelee & Johnson ABSTRACT: Industrial process control apparatus in which a digital computer is utilized for controlling the process, the controlled process loops of the digital computer system being provided with analog "backup" controllers. In the event of failure, control of the process condition is automatically switched to the analog controller which takes over the functions previously carried out by the digital computer.

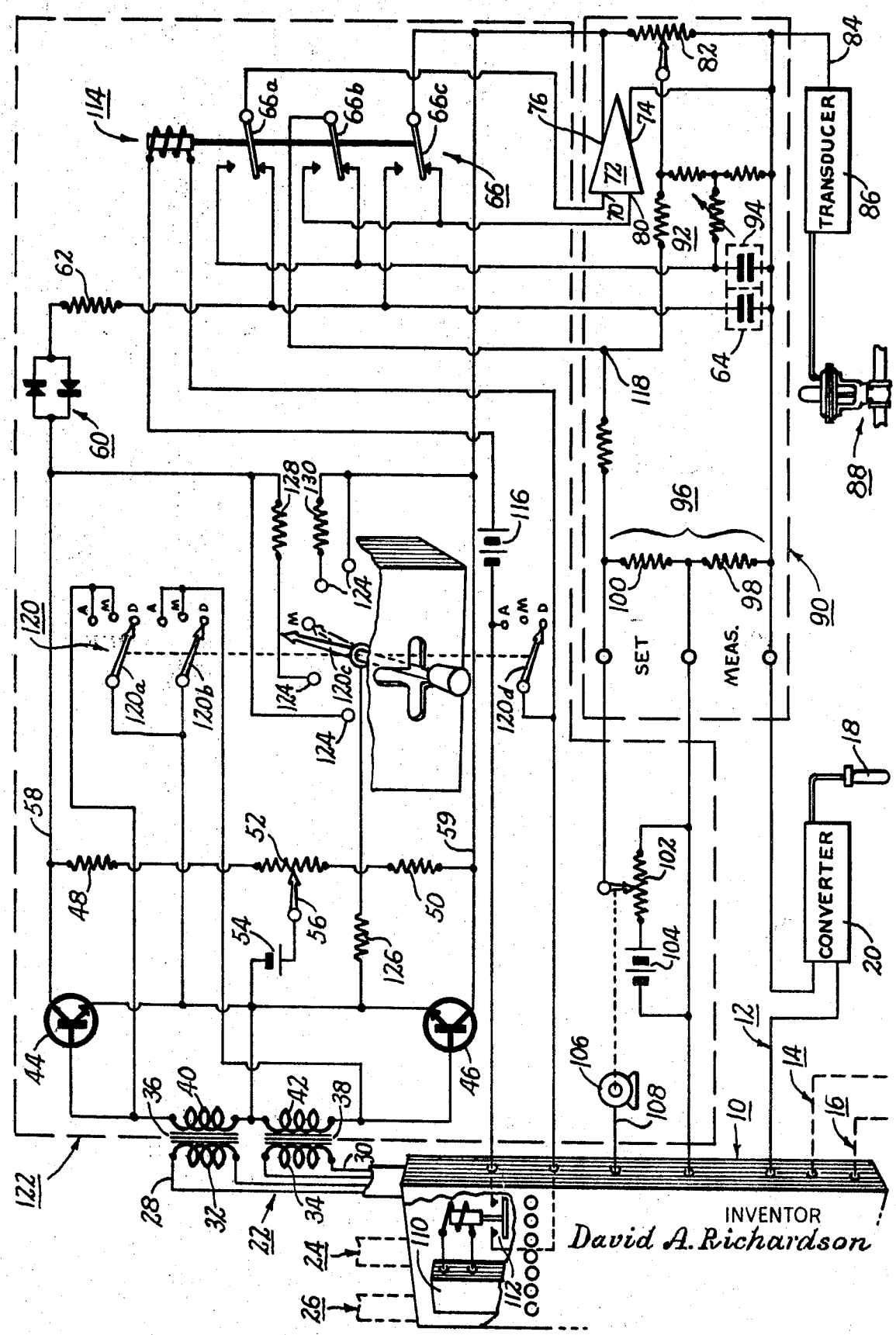

DIGITAL AND ANALOG PROCESS CONTROL APPARATUS

This application is a continuation of application Ser. No. 582,750 filed Sept. 28, 1966 and now abandoned.

This invention relates to industrial process control apparatus. More particularly, this invention relates to such apparatus utilizing a digital computer for controlling the process.

Digital computers have been used for a number of years for controlling industrial processes. Generally such computers now are used in a time-sharing arrangement so that a single computer can control a number of distinct process conditions such as pressure, temperature, flow rate, etc., at different points of a complex process. The number of controlled conditions may be quite large, e.g. several hundred may be assigned to a single computer which samples each condition in sequence, calculates (according to a preset program) the appropriate changes to be made to a process variable such as a valve, and transmits to the respective valve a command representing the calculated change. Details of a practical time-shared computer control system are set forth in copending application Ser. No. 430,994 filed by R. A. Lawler et al. on Feb. 8, 1965 and now abandoned.

Although present day digital computers are highly reliable, they are not infallible. Of course, the statistical probability of loss of control can be reduced to a quite low level by known techniques of redundancy, e.g. by providing two complete computers which operate continuously in parallel, each serving to check the functioning of the other, and either being capable of independent control of the complete process in the event of failure of the other. However, in many practical installations redundancy is not an economically feasible solution to the problem of reliability. Thus there is a need for novel apparatus for assuring continued control of the process condition following failure of a digital computer.

In the digital computer control system to be described hereinafter, all of the controlled process loops (or certain selected loops) are provided with respective analog "backup" controllers each capable of full control of the corresponding condition. During normal operation under computer control, major portions of each analog controller are utilized to develop the computer-determined control signal to be sent to the corresponding process valve. In the event of computer failure, control of the process condition is automatically switched to the analog controller which takes over the required dynamic functions previously carried out by the digital computer and continues, as before, to produce the control signal to be sent to the valve. The transition from digital to analog control is effected smoothly by the use of two separate memory devices one of which stores a signal developed from the computer command signals, and the other of which stores a signal derived from the analog controller circuitry. Although the system shown is an embodiment incorporating an analog controller of the proportioning-plus-reset type, systems utilizing other types of analog controllers can be utilized in accordance with the principles of this invention.

Accordingly, it is an object of this invention to provide automatic process control apparatus which is superior to that available heretofore. A more specific object is to provide a novel digital computer control system having means for assuring continued control of the process in the event of failure of the digital computer.

Other objects, aspects and advantages of the invention will in part be pointed out in, and in part apparent from the following description considered together with the accompanying drawing the single FIGURE of which is a schematic diagram of portions of a system incorporating the present invention.

Referring now to the drawing, a high-speed digital computer 10 is provided with a number of measurement signals by respective circuits illustrated at 12, 14 and 16. The first of these circuits 12 is shown in detail, and includes a primary element, such as a temperature bulb 18, connected to a conventional converter 20 adapted to produce a measurement signal in the form of an electric current, e.g. in the range of 10—50 milliamperes. The computer includes a multiplexing device (not shown herein) arranged to sample the measurement signals periodically and to convert each sampled signal level to a digital number for processing. The computer processes each measurement completely before proceeding to the next, and produces a corresponding signal on respective command circuits illustrated at 22, 24 and 26. In a typical computer control system having, say, 100 loops (i.e. 100 measurement and command circuits), each measurement signal might be sampled and processed once every second.

Only command circuit 22 is illustrated in some detail, and, as shown, includes a pair of signal channels 28 and 30 leading to the primaries 32 and 34 of respective transformers 36 and 38. One of the channels (28) carries those command signals which direct the controlled process valve to move in one direction (e.g., up) while the other (30) carries those command signals which direct the valve to move in the other direction (down). Both types of command signals are pulses having a constant amplitude and a duration proportional to the amount of change to be made in the valve position. In a typical system, the pulse durations may be in the range of 10 microseconds to 10 milliseconds.

The secondaries 40 and 42 of transformers 36 and 38 are coupled to respective transistor amplifiers 44 and 46 the outputs of which are connected to opposite ends of a balanced load comprising resistors 48 and 50 and a balance adjustment potentiometer 52. The amplifiers are energized by a power supply represented in the drawing as a battery 54 connected between the potentiometer arm 56 and the emitter of the transistors.

With this arrangement, command signals on channels 28 and 30 will produce on amplifier output lead 58 (and return lead 59) corresponding positive and negative pulses. These pulses are directed through an isolation circuit 60 (consisting of a pair of reverse-connected diodes) and a series resistor 62 to a first memory means in the form of a capacitor element 64.

The computer-developed command pulses also are applied through switch arm 66a of a switch 66 to one input terminal 70 of a relatively high-gain amplifier 72. A negative feedback path is established by a connection between amplifier output lead 74 and the lower plate of memory capacitor 64, while the other amplifier output lead 76 is connected through switch arm 66c to the other input terminal 80. With these circuit connections, memory capacitor 64 is arranged as a linear integrator to charge or discharge at a constant rate in response to positive or negative command pulses (of constant amplitude) directed thereto from amplifiers 44 and 46. Also, the amplifier output, represented by the current flowing from output lead 74 up through a proportioning potentiometer 82 to the other output lead 76, is proportional to the charge stored in the memory capacitor 64, and this charge remains essentially uncharged during the times between command signals, due to feedback action of the amplifier.

A control signal derived from the amplifier output current through potentiometer 82 is directed through a lead 84 to a conventional transducer 86 arranged to produce a proportionate pneumatic pressure for a process control valve 88. This valve is thereby caused to take a position corresponding to the charge stored on the memory capacitor 64. It will be evident that the valve will be held fixed in this position during the times when the computer 10 is carrying out computations respecting the other process conditions to be controlled.

Amplifier 72 forms an integral part of an analog process controller shown in the drawing within a dashed-line enclosure identified with the reference numeral 90. In addition to the amplifier, this controller includes a reset feedback circuit 92 of the type described in detail in copending application Ser. No. 507,765 filed by D. A. Richardson et al. on Nov. 15, 1965. This reset circuit includes a second memory means in the form of a reset capacitor element 94. While the process valve 88 is being controlled by the computer 10, as described above, the charge on this reset capacitor 94 is held at a level which is a function both of the amplifier output signal and of a so-called "deviation" signal (to be explained) appearing between the leads identified with the reference numeral 96. The operation of this charge-holding circuit is described in more detail in copending application Ser. No. 507,780 filed by D. A. Richardson et al. on Nov. 15, 1965, and specifically serves to hold the charge at a level proportional to the difference between the two signals. The reset capacitor charge is so adjusted in order to prepare the circuitry for a smooth transition to full control by the analog controller in the event of failure of the digital computer 10.

The deviation signal 96 referred to above corresponds to the difference between the actual measured value of the condition and a desired value of the condition. The deviation signal is developed by a comparison circuit comprising two resistors 98 and 100 across which opposing voltage drops are developed. The voltage drop across the lower resistor 98 is developed by the measurement current from converter 20, while that across the upper resistor is controlled by a potentiometer 102 which is energized by a battery 104 and positioned by a stepping motor 106.

Although the magnitude of the set point signal on resistor 100 can be selected or set in a number of different ways, one advantageous arrangement, shown herein, is to continually adjust the set point signal to a magnitude corresponding to the set point value calculated by the computer 10 to be most appropriate under existing circumstances. Thus the motor 106 is shown activated by a line 108 leading to the computer to indicate that the potentiometer position (and hence the set point signal) is determined and continually updated by the computer. It may alternatively be desirable to cause the set point signal to follow the measurement signal, e.g. in circumstances where it can be assumed that the process condition is being held closely to the proper value by the control system. Under some circumstances, it may be desirable to fix the set point signal to some predetermined constant value to which the process condition is to be adjusted upon failure of the computer.

When the computer 10 fails, the failure will be detected by conventional means. For example, the computer may include an analyzing unit, indicated by a block 110, which periodically checks certain critical points or elements of the computer and produces a warning signal if any does not shown predetermined characteristics. Or the computer program may include appropriate procedures for carrying out periodically a preset test calculation and, if an incorrect result is produced, develop a warning signal to indicate probable failure. In any event, means are provided responsive to such failure indication to close a switch contact 112 and thereby energize a relay 114 from a supply source 116.

Energization of relay 114 causes all switch arms 66a, 66b and 66c to be shifted to their upper fixed contacts. These switches are comparable in function to the transfer switch arrangement described in the above identified copending application Ser. No. 507,780, and serve to place the analog controller 90 in full automatic control of the valve 88 with a smooth "bumpless" transition from centralized computer control.

In more detail, switch 66a connects the upper plate of the reset capacitor 94 directly to the one input terminal 70 while switch 66b connects intermediate point 118 of the reset circuit 92 to the other input terminal 80. Since the potential on the upper plate of the reset capacitor had, before switchover, been connected to point 118 by switch 66b, and thus held at the same potential as point 118, the two input terminals 70 and 80 immediately after switchover will be at the same potential. Before switchover, the amplifier input was virtually zero (typically within a fraction of a millivolt), and therefore at switchover the amplifier input signal will not experience any significant change.

After switchover to analog operation, the feedback action through point 118 will instantly bring the amplifier input to essentially the same value as before switchover, and the high gain of the amplifier 72 assures that equilibrium is achieved with no effective change in the amplifier output. Thus it will be seen that the charge on the reset capacitor 94 is maintained, while the process is under computer control, at the value which provides a smooth "bumpless" transfer to automatic control in the event of computer failure. After switchover, the analog controller 90 exercises normal automatic control, bringing the controlled process condition to the set point if initially there is any deviation from the set point value.

While the analog controller 90 is in control of the process condition, switch 66c connects the memory capacitor 64 across the output of the amplifier 72 to store in that capacitor a charge corresponding to the control signal being transmitted to the process valve. Thus, when the process ultimately is switched back to computer control, the transition will be smooth and the computer thereafter can direct further command signals to the memory capacitor 64 to alter the position of the valve in accordance with further calculations of the computer.

The control apparatus also includes a manually operable transfer switch 120 for shifting from computer control to manual control, or to full automatic control by the analog controller 90. Switch 120 thus has three positions, labeled D for digital, M for manual, and A for analog. Advantageously this switch is located at the controller together with the associated circuitry pictured within the dotted line enclosure 122. Physically, the switch comprises a lever which is shiftable vertically between its three positions D, M and A.

When switch 120 is shifted from D to M position, switch arms 120a and 120b complete circuits which short out the inputs to transistor amplifiers 44 and 46. This disables any command signals from computer 10, so as to permit independent control of the process valve manually.

Switch 120 is so arranged mechanically that when it has been shifted to its vertical center position (M), the switch lever than can be shifted horizontally from side-to-side so as to bring switch arm 120c selectively into engagement with associated contacts 124. These contacts serve to connect the battery 54 through a current-limiting resistor 126 to output lead 58 (or return lead 59), so as to transmit a signal of positive or negative polarity to the memory capacitor 64 for so long as the switch is engaged. Resistor 126 reduces the signal level substantially below that produced by a computer command signal, to take account of the fact that a computer pulse is of much shorter duration than can conveniently be produced by manual closure of a switch. The switch 124 can be connected directly to leads 58 and 59 or through resistors 128 and 130, so as to provide fast or slow movement of the process valve 88.

When the switch 120 is moved up to its A position, switch arm 120d completes the energizing circuit for relay 114, and switch 66 thereby is shifted to its A condition wherein, as described above, the analog controller 90 takes over independent control of the process valve and the memory capacitor 64 is held charged at a level corresponding to the control signal directed by the amplifier 72 to the process valve. Thus, at any time, switch 120 can be shifted back to M or D position without upsetting the process.

Although a preferred embodiment of this invention has been set forth in detail, it should be recognized that this is for the purpose of illustrating the invention and should not be considered a limitation on the scope thereof, it being understood that the invention can be modified in numerous ways by those skilled in the art.

I claim:

1. Process control apparatus comprising a high speed digital computer; sensing means associated with the process to direct to said computer at least one measurement signal indicating the magnitude of a process condition being controlled, said computer including means responsive to said measurement signal for producing corresponding command signals representing calculated changes in a process variable, such as a valve or the like, required to maintain said process condition at a selected value;

an analog controller adapted to receive condition measurement and set signals and including means to produce a deviation signal representing the departure of the condition from its set value, said analog controller comprising an amplifier having associated therewith first and second memory means adapted to retain signal values directed thereto;

switch means operable into either of first or second conditions for placing said analog controller in respective operating modes;

first circuit means operative when said switch means is in said first condition and arranged to direct said computer command signals to said first memory means to produce and retain thereat a signal representing the desired level of the process variable, said first circuit means also including means coupling said first memory means to said amplifier to produce an amplifier output signal corresponding to the signal stored in said first memory means an adapted to serve as a control signal to adjust said process variable; said first circuit means further including means to direct to said second memory means signals corresponding to said deviation and output signals so as to store and retain at said second memory means a signal level which is a function of said deviation and output signals; and second circuit means operative when said switch means is shifted to said second position and arranged to remove said first memory means form control of said amplifier output signal, said second circuit means also including means to couple said deviation signal to said amplifier input with a negative feedback circuit opposing said deviation signal, said second circuit means further including means to connect said second memory means to said input circuit to combine the signal stored thereon with said deviation signal, the signal stored by said first circuit means in said second memory means prior to switchover having a magnitude to prevent any significant change in the value of the amplifier output signal at the instant of switchover, thereby to assure a smooth transition in such switchover.

2. Apparatus as claimed in claim 1, wherein said computer includes means arranged to detect an operating failure of said computer, said switch means being under the control of said failure detection means to switch control of the process condition smoothly to said analog controller in the event of failure of said computer.

3. Apparatus as claimed in claim 2, wherein said second circuit means is arranged, when operated by said switch means, to connect said second memory means in said feedback circuit so as to provide reset action in the output of said amplifier.

4. Apparatus as claimed in claim 1, wherein said first and second memory means are capacitors adapted to store an electrical charge representing by its magnitude a signal level to be retained.

5. Apparatus as claimed in claim 4, wherein said computer command signal consists of periodic pulses the lengths of which represent the calculated change to be made in said process variable, and the polarity of which indicates the direction of such change.

6. Apparatus as claimed in claim 1, wherein said analog controller includes a second switch means having at least first and second positions for alternatively conditioning the control system for digital computer control or automatic analog control by said analog controller, said second switch means in its first position serving to couple said computer command signals through said first switch means to said first memory means, said second switch means in said second position serving to disable said computer command signals and to operate said first switch means to its second condition, whereby to transfer the operation of said control system to said analog controller with a smooth transition.

7. Apparatus as claimed in claim 6, wherein said second switch means has a third position in which the control system is conditioned for manual operation, said second switch means in said third position serving to disable said computer command signals while maintaining said first switch means in its first condition, and manually-operable means for directing manual command signals to said first memory means while said second switch means is in its third position, whereby to adjust the output of said amplifier to any selected level.

8. Apparatus as claimed in claim 1, including second switch means for transferring the control system from digital computer control to manual control, said second switch means in its manual position serving to disable said computer command signals, and manually operable means arranged when said second switch means is in manual position to direct to said first memory means manual command signals so as selectively to adjust the magnitude of the output of said amplifier.

9. Apparatus as claimed in claim 1, including means to develop and direct to said analog controller a set point signal corresponding to a desired level of said process condition.

10. Apparatus as claimed in claim 9, wherein said set point means comprises means coupled to said computer to provide a set point signal in accordance with calculations of said computer.

11. Apparatus as claimed in claim 10, wherein said set point means comprises a motor the position of which is controlled by said computer, and voltage-producing means under the control of said motor to produce an electrical set point signal corresponding to said position.

12. Process control apparatus comprising a high speed digital computer; sensing means associated with the process to direct to said computer a plurality of measurement signals each indicating the magnitude of a process condition being controlled, said computer including means responsive to said measurement signals for producing corresponding command signals representing calculated changes in respective process variables, such as a valve or the like, required to maintain said process condition at a selected value; there also being provided for each condition:

an analog controller adapted to receive respective condition measurement and set signals and including means to produce a deviation signal representing the departure of the condition from its set value, said analog controller comprising an amplifier having a relatively high gain and negative feedback means;

switch means operable into either of first or second conditions for placing said analog controller in respective operating modes;

means responsive to failure of said computer for shifting said switch means from said first condition to said second condition;

first circuit means operative when said switch means is in said first condition and arranged to direct said computer command signals to said amplifier input to produce an amplifier output signal representing the desired level of the process variable and adapted to serve as a control signal to adjust said process variable; and second circuit means operative when said switch means has been shifted to said second position and arranged to remove said computer command signals from control of said amplifier output signal, said second circuit means also including means to couple said deviation signal to said amplifier input with said negative feedback means providing a feedback opposing said deviation signal, whereby said analog controller is placed in full independent control of the process in the event of failure of the computer.

13. A process control system for controlling a process condition in either digital-computer control mode or analog control mode and comprising:

a high-speed digital computer;

sensing means associated with the process to direct to said computer at least one measurement signal indicating the magnitude of a process condition being controlled, said computer including means responsive to said measurement signal for producing corresponding digital command signals concerning the value of a process variable, such as a valve or the like, required to maintain said process condition at a selected level;

receiving means adapted to receive condition measurement and set signals for analog control of said process condition;

an analog amplifier having an input and adapted to produce an output signal suitable for setting the value of said process variable;

memory means adapted to retain signal values directed thereto;

switch means selectively operable into first or second conditions for placing said process control system in either digital or analog operating mode, respectively;

first circuit means operative when said switch means is in said first condition (digital mode) to direct said computer command signals to said memory means to store therein first signals indicating the desired value of the process variable;

said first circuit means also including means coupling said stored first signals to said amplifier input to produce output signals from said amplifier corresponding to the stored first signals, whereby the process variable is under the control of said computer through the agency of said amplifier;

said first circuit means further including means coupled to said receiving means while the process control system is operating in digital mode to store in said memory means second signals reflecting said measurement and set signals, for subsequent use in switching over to analog mode;

second circuit means operative when said switch means is in said second condition (analog mode) to couple to the input of said amplifier a deviation signal representing the difference between said measurement and set signals to cause the amplifier output to respond to changes in said measurement signal to tend to maintain the process condition constant;

said second circuit means including means operable at the instant of switchover to analog mode to couple to the input of said amplifier a signal corresponding to said previously stored second signals and opposing said deviation signal to establish momentarily a zero signal condition at the input of said amplifier, thereby to assure a smooth transition at the instant of switchover.

14. A system as claimed in claim 13, wherein said memory means includes means operable in analog mode to store a signal corresponding to the output signal of said amplifier; and
means for applying said stored output signal to said amplifier after switchback to digital mode so as to hold the amplifier output constant in the period immediately after switchback.

15. A system as claimed in claim 13, wherein said memory means comprises two capacitors arranged to store separate signal levels.

16. A system as claimed in claim 15, wherein one of said capacitors is coupled as a feedback capacitor for said amplifier when the system is in digital mode.

17. A system as claimed in claim 15, wherein one of said capacitors serves in digital mode to store a signal corresponding to the deviation between the measurement and set signals.

18 An automatic process control system for controlling at least one condition of an industrial process and operable in either digital-computer control mode or analog control mode, said system comprising:

sensing means associated with the process to develop at least one measurement signal indicating the magnitude of a process condition to be controlled;

means to produce a set signal indicating the desired magnitude of said process condition;

digital computer means including means responsive to said measurement signal for producing corresponding digital command signals concerning the value of a process variable, such as a valve or the like, required to maintain said process condition at a selected level;

means for generating an analog control signal for setting the value of said process variable;

memory means adapted to retain signal values directed thereto;

switch means selectively operable into first or second conditions for placing said process control system in either digital or analog operating mode, respectively;

first circuit means operative when said switch means is in said first condition (digital mode);

said first circuit means including means to produce from said generating means an analog control signal responsive to said computer command signals, whereby the process variable is under the control of said computer;

said first circuit means further including means operative while the process control system is operating in digital mode to store in said memory means signals reflecting said measurement and set signals, for subsequent use in switching over to analog mode;

second circuit means operative when said switch means is in said second condition (analog mode);

said second circuit means including means to produce from said generating means an analog control signal responsive directly to changes in said measurement and set signals to tend to maintain the process condition at said desired set magnitude;

said second circuit means also including means operable at the instant of switchover to analog mode to utilize said stored signals to maintain the analog control signal produced by said generating means essentially constant during and immediately after the switching transition, thereby to assure a smooth changeover to analog mode.

19. Apparatus as claimed in claim 18 wherein said generating means comprises an electrical amplifier; and
capacitor means connected to said amplifier to carry a charge responsive to said computer command signals when the system is in digital mode, said capacitor means being operable to produce from said electrical amplifier an analog signal corresponding to said charge placed thereon by said computer command signals.

20. Apparatus as claimed in claim 19, including means operable while in analog mode to dissipate slowly the effects of said stored signals on said generating means during the period of transition after switchover to analog mode, so as to return the process condition smoothly to control solely by said measurement and set signals without influence of the signals stored while in digital mode.

21. Apparatus as claimed in claim 20, wherein said memory means comprises a second capacitor means operable in digital mode to store signals reflecting said measurement and set signals; and
means operable in analog mode to utilize said second capacitor means to introduce reset action in the analog control signal produced by said generating means.

UNITED STATES PATENT OFFICE
CERTIFICATE OF CORRECTION

Patent No. 3,578,958                    Dated May 18, 1971

Inventor(s) David A. Richardson

It is certified that error appears in the above-identified patent and that said Letters Patent are hereby corrected as shown below:

Column 5, line 25, after "signals;" insert -- said switch means serving in said second condition to remove said first memory means from control of said amplifier output signal; --; lines 27 to 31, cancel "position and arranged to remove said first memory from control of said amplifier output signal, said second circuit means also including means"; line 27, after "second" insert -- condition --; line 64, "positions" should read -- conditions --; lines 67, 69 and 75, Column 6, lines 2, 6, 11 and 13, "position", each occurrence, should read -- condition --. Column 6, line 52, after "to" insert -- an input of --; same line 52, after "amplifier" cancal "input"; line 56, after "variable" insert -- said switch means serving in said second condition to remove said computer command signals from control of said amplifier output signal; --; lines 59 to 62, after "second" cancel "position and arranged to remove said computer command signals from control of said amplifier output signal, said second circuit means also including means"; line 62, after "second" insert -- condition --; same line 62, after "to", second occurrence, insert -- an input to --; line 63, after "amplifier" cancel "input". Column 7, line 1, after "corresponding" cancel "digital"; lines 17 and 18, after "direct" cancel "said computer command signals"; same line 18, after "means" insert -- signals corresponding to said computer command signals --.

Signed and sealed this 30th day of November 1971.

(SEAL)
Attest:

EDWARD M. FLETCHER, JR.          ROBERT GOTTSCHALK
Attesting Officer                Acting Commissioner of Patents